F. B. RAE.
VEHICLE DRIVING GEAR.
APPLICATION FILED FEB. 5, 1910.
1,117,243.
Patented Nov. 17, 1914.
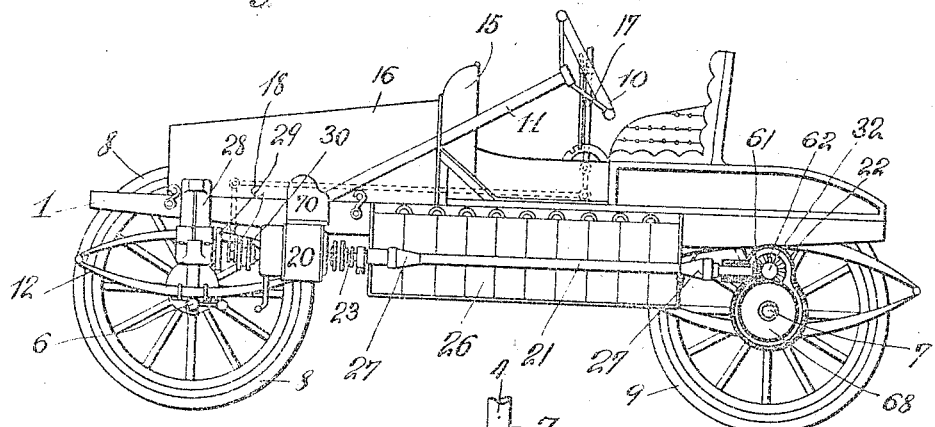
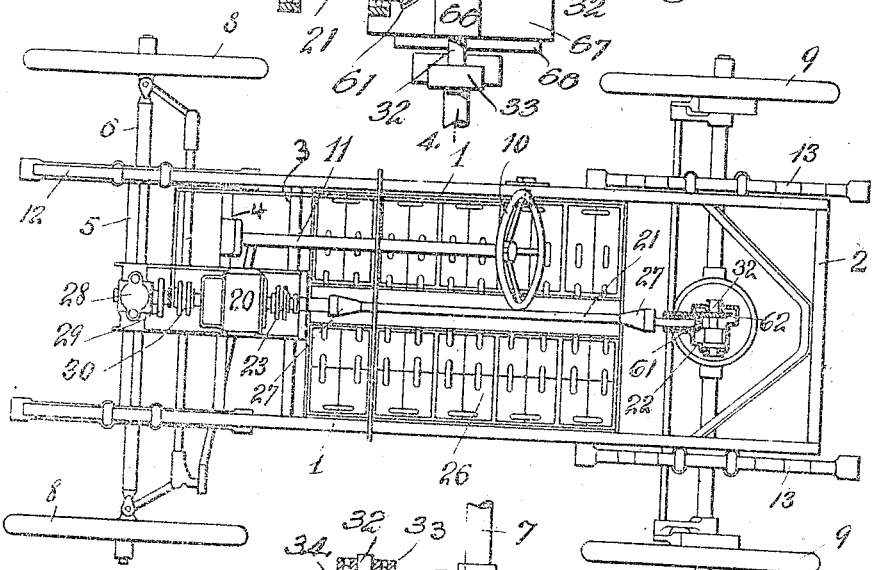
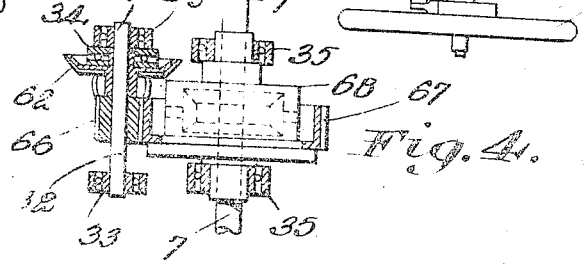
Witnesses:
Henry J. Lucke
Geo. N. Kerr
Inventor
Frank B. Rae,
By his Attorneys
Edwards, Sager & Wooster

UNITED STATES PATENT OFFICE.

FRANK B. RAE, OF SPRINGFIELD, VERMONT, ASSIGNOR, BY MESNE ASSIGNMENTS, TO RAE ELECTRIC COMPANY, A CORPORATION OF MICHIGAN.

VEHICLE DRIVING-GEAR.

1,117,243.   Specification of Letters Patent.   Patented Nov. 17, 1914.

Original application filed June 18, 1907, Serial No. 379,593. Divided and this application filed February 5, 1910. Serial No. 542,365.

*To all whom it may concern:*

Be it known that I, FRANK B. RAE, citizen of the United States, residing at Springfield, in the county of Windsor and State of Vermont, have invented certain new and useful Improvements in Vehicle Driving-Gear, of which the following is a full, clear, and exact specification.

This invention relates to motor vehicles, and more particularly to the driving mechanism.

An object of this invention is to provide a rear axle shaft driven vehicle having the motor mounted at the front and driving a shaft including universal joints alined in a horizontal plane therewith; in addition to said shaft the motor is connected with the live rear axles by clutches and driving and differential gearing, so as to permit a desired gear reduction between the wheels and the motor. In the preferred form of my invention the rear gear of the driving shaft is disposed above the differential, said gear driving the differential through a gear fixed on the exterior of the casing of the differential.

Other objects and features of my invention will be more fully understood from the following description and the accompanying drawings, wherein—

Figure 1 is a side elevation of a driving mechanism for a vehicle and embodying my invention; Fig. 2 is a plan view; Fig. 3 is a detail plan of the reducing gearing, and Fig. 4 is a vertical section through the line 4, 4 of Fig. 3.

Referring to Figs. 1 and 2, the side frames 1, 1 of the vehicle are provided with crossbars 2, 3, 4, 5, axles 6, 7, wheels 8, 8, 9, 9. The steering wheel 10 is connected with the wheels 8, 8 through the post 11; the springs 12, 12, 13, 13, are of the usual construction. The vehicle is provided with a dash 15 and a removable hood 16, the latter inclosing the motor and driving parts. The live axles 7, 7 are driven from an electric motor 20 carried low in a curved cradle by a shaft 21 through bevel gears 61, 62 in the casing 22, and spur gears 66, 67, the latter being on a differential casing 68 containing differential gears connecting the live axles 7. This applies a double reducing gearing upon the motor shaft and the wheels. The universal joints 27 allow for the springing of the vehicle body. In this construction it will be noted that the gear 61 is disposed above the differential casing 68, thus permitting the shaft 21 and universal joints 27, 27 to be arranged in a substantially straight line in a horizontal plane, thus avoiding the objectionable feature, common in prior devices, of tipping the motor shaft. The motor 20 is mounted in the front of the vehicle under the hood 16 and drives the shaft 21 through a clutch 23 which is controlled by a lever and fork, as will be understood. The current for the motor is supplied by a storage battery 26 hung from the middle of the vehicle body between the wheels. The battery is divided longitudinally into two sections between which the driving shaft 21 passes. The electric controlling means are described more fully in my application, Serial Number 379,593, filed June 18, 1907, of which application the present application is a division.

Mounted in front of the motor is a gas engine 28, of any desired type, with a flywheel 29, and adapted to drive the motor shaft through a clutch 30. This clutch has a fork 18 operated by a lever 17. The vehicle will carry a supply of fuel for the engine and suitable connections and accessories will also be provided. Under normal conditions, the storage battery supplies current for the motor, and the latter drives the shaft 21 and the wheels through clutch 23, which will be closed and held by the rack. Also, the wheels can drive the motor as a generator or brake through the clutch 23 as well as the engine. The clutch 30 will be out and the movement of the motor thus does not affect the engine 28, which therefore remains at rest and the fuel cut off. In case it is desired to drive the motor as a generator by the engine to charge the battery, the clutch 30 will be thrown in and the clutch 23 out, thus preventing any movement of the vehicle, and the output of the motor can be governed by means of switching apparatus, said features being fully described in my earlier application referred to above. In normal operation, the clutch 23 will be in engagement and the engine shaft disconnected, the clutch 30 being out of engagement, thus forming a driving engagement between the motor and the shaft 21. The controller 70 mounted on the motor frame under the hood comprises a number of separate switches for obtaining the various circuit changes; these switches are ordinarily in practice combined in a unitary structure.

Referring to Figs. 3 and 4, the shaft 21 is provided at its end near the bevel gear 61 with ball bearings 31, 31. The bevel gear 62 has its collar fixed to the short shaft 32, the latter being journaled in the casing 22 by means of the ball bearings 33, 33. I prefer to dispose a thrust bearing 34 adjacent the gear 62 to take the thrust of the gear 61 upon the gear 62. The live axles 7, 7 are mounted at their ends in the casing 22 in ball bearings 35, 35.

Having thus described my invention, I declare that what I claim as new and desire to secure by Letters Patent, is—

1. The combination with a chassis having front and rear wheels, of a motor of the variable speed type mounted at the front of the chassis, a shaft extending from the front of the chassis rearwardly, a clutch for directly connecting said shaft with the shaft of said motor, a bevel gear having its stud connected by a universal connection with said shaft, a second bevel gear driven by said first named bevel gear, and a differential driven by said second bevel gear, said two bevel gears being disposed above said differential.

2. The combination with a chassis having front and rear wheels, of a propulsion motor mounted on the front portion of said chassis and having a driving shaft extending rearwardly toward the rear wheels, live shafts for driving said rear wheels, a differential gear for driving said shafts comprising pinions and a spider, a spur gear on said spider, a transverse shaft parallel to said live shafts carrying a pinion meshing with said spur gear, and bevel driving gears connecting said transverse shaft and said driving shaft.

3. The combination of a chassis having front and rear wheels, of a motor mounted at the front of the chassis with its shaft disposed in a substantially horizontal plane, a driving shaft adapted to be directly actuated by said motor and disposed in a substantially horizontal plane, said driving shaft having a universal connection, a differential gear connected to the axles of said rear wheels, and double reduction gearing between said shaft and said differential, said double reduction gearing including a spur gear mounted on said differential gear and driving the same, and further including a bevel gear for driving said spur gear.

4. The combination of a chassis, having front and rear wheels, of a motor mounted at the front of the chassis, a driving shaft including a universal connection alined therewith in a substantially horizontal plane, said shaft extending rearwardly and having a bevel gear at or near its rear end, a differential gear for driving the wheels, and double reduction gearing including a second bevel gear between said first named bevel gear on said shaft and said differential gear, said two bevel gears being disposed above said differential gear.

5. The combination of a chassis having front and rear wheels, of a motor mounted at the front of the chassis, a driving shaft including a universal connection alined therewith in a substantially horizontal plane, said shaft extending rearwardly and having a bevel gear at or near its rear end, a differential gear for driving the wheels, double reduction gearing including a second bevel gear between said first named bevel gear on said shaft and said differential gear, and unitary means for inclosing and supporting said double reduction gearing and said differential gear, said two bevel gears being disposed above said differential gear.

In testimony whereof I affix my signature, in presence of two witnesses.

FRANK B. RAE.

Witnesses:
EDMUND O. DUBOCQ,
GEO. N. KERR.